March 17, 1970   J. R. MODEN   3,500,509
REINFORCED BUTTONHOLE
Filed July 1, 1966

INVENTOR.
JAMES R. MODEN
BY
*Salter & Michaelson*
ATTORNEYS

United States Patent Office 3,500,509
Patented Mar. 17, 1970

3,500,509
REINFORCED BUTTONHOLE
James R. Moden, Barrington, R.I., assignor to AMH Corporation, Barrington, R.I., a corporation of Rhode Island
Filed July 1, 1966, Ser. No. 562,307
Int. Cl. A41f 1/00
U.S. Cl. 24—202
2 Claims

ABSTRACT OF THE DISCLOSURE

A buttonhole formed in an article of apparel that is defined by a film of plastic material that is interposed between layers of flexible material of the article of apparel, the film of plastic material being fused to the layers in concealed relation therein such that there is no penetration of the plastic film through the layers to the outer surfaces thereof, a slit extending through the fused plastic film and layers of material to define the buttonhole therein.

---

The present invention relates to a buttonhole and to the method of making same. More particularly, the present invention relates to a buttonhole construction as formed in an article, such as a garment, wherein stitching normally associated with buttonholes is eliminated.

Heretofore, buttonhole constructions and articles of apparel and the like have normally been formed by binding the edges of the slit by sewing and then slitting the material between the bound edges. Some attempts have been made heretofore to reinforce the edges of the buttonholes as formed in garments and articles of apparel by the application of synthetic materials, such as plastic or rubberized materials. However, prior to the instant invention, none of these heretofore known techniques have been found to be acceptable, primarily because of the time consuming procedures required for the application of the materials to the edges of the buttonhole slits. In certain of the prior known buttonhole constructions in which synthetic materials were used, the synthetic material was exposed, and this, too, has been found to be objectionable.

The present invention defines a unique method of forming a buttonhole and basically provides for the formation of the buttonhole by forming a compressed laminate in a selected area and thereafter cutting a slit in the selected area of the laminate. The laminate is formed by inserting a film of plastic material between two layers of flexible sheet-like material that may comprise portions of the article in which the buttonhole is to be formed. With the plastic film disposed between the layers of flexible material, heat and pressure are applied thereto, thereby compressing the layers with the film therebetween to form the laminate. The laminate as formed includes a beaded portion between which the slit is cut, the beaded portion thus defining a reinforcing area for the buttonhole as defined by the slit. Since the laminate includes the layers of flexible material that are fused to the film of plastic when heat and pressure are applied thereto, the edges of the slit are fused and will prevent unraveling or ripping of the buttonhole when in use.

Accordingly, it is an object of the present invention to provide a buttonhole construction for use in an article that is defined by the fusing of a film of plastic between layers of a flexible material in a selected area.

Another object of the invention is to teach a method of forming a buttonhole in an article by fusing a film of plastic material between adjacent layers of a flexible material in a selected area.

Still another object is to provide a buttonhole in an article wherein a slit is formed in a laminate after the formation of the laminate upon fusing of a plastic material to adjacent sheet-like materials.

Other objects, features and advantages of the invention will become apparent as the description thereof proceeds when considered in connection with the accompanying illustrative drawings.

In the drawings which illustrate the best mode presently contemplated for carrying out the present invention:

Figure 1:
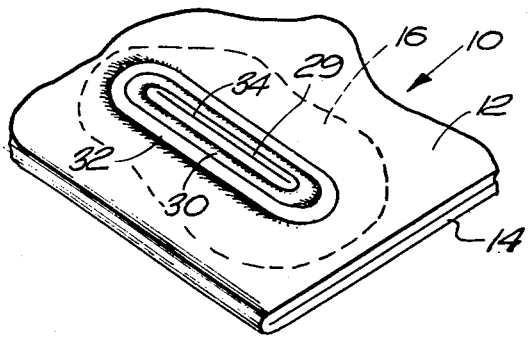
FIG. 1 is a perspective view of a portion of an article in which the buttonhole of the present invention is formed.

Referring now to the drawing and particularly to FIGS. 1 through 4, one form of a buttonhole construction as formed in an article is illustrated. Insofar as the article in which the buttonhole is adapted to be formed is concerned, it is understood that the buttonhole may be formed in any garment or material or article as normally constructed heretofore. In this connection, the material from which the article is fabricated is generally flexible in nature and may be defined as being sheet-like in the formation thereof. In the description to follow hereinafter, reference will be made to a plurality of flexible materials or layers of material, and it is understood that such layers of material are normally associated in the area of the article of apparel or garment in which a buttonhole construction is to be formed. As will be further set out hereinafter, the present invention may be employed with a single layer of flexible material and a second layer of material defined by a patch or the like provided specifically for the purpose of the present invention.

As illustrated in FIG. 1, a garment or article of clothing is generally indicated at 10 and includes a first sheet or layer of flexible material 12. Disposed under the sheet or layer of flexible material 12 is a second layer of flexible material 14, the layers of material 12 and 14 defining an area in which buttonhole constructions are to be formed. The layers of material 12 and 14 are normally fabricated of a fabric-like material such as is found in articles of clothing; however, other sheets or layers of material can be employed without departing from the spirit of the invention. Disposed between the layers of material 12 and 14 and inserted therein prior to the formation of the buttonhole to be described is a film of plastic material 16. The film of plastic material is preferably polymeric in character and can be an elastomer such as a thermoplastic or a thermosetting plastic. In this connection, elastomers, such as silicone and fluorocarbon, have been employed in the construction of the buttonhole embodied herein with good results. As will be set forth hereinafter, any suitable plastic material may be employed in the construction of the buttonhole, provided that the characteristics thereof are sufficient to satisfy the requirements for the fusing thereof with the layers of material 12 and 14. The thickness of the film of plastic material 16 is controlled to some extent by the weave of the fabric embodied in the layers of material 12 and 14. Thus, if an open type of weave is employed in the layers 12 and 14, then a relatively thinner film of plastic material 16 would be utilized. Under normal circumstances and with the use of materials such as found in shirts or the like for the layers of material 12 and 14, the thickness of the film of plastic is usually in the range of five to twenty mils. In the formation of the buttonhole construction as embodied in the present invention, the layers of material 12 and 14 are adapted to be fused directly to the film of plastic 16 in a selected area. For this purpose, a die 20 is employed and includes a head 22 in which an oval-shaped groove 24 is formed on the underface thereof. The oval-shaped groove 24 as defined in the head 22 defines an outer oval land 26 and an inner land 28. Die 20 is adapted to be heated in any conventional manner, and in this connection, the temperature is controlled in accordance with the material that is employed as the plastic film. Thus, it is essential that the plastic film be sufficiently heated to be plastic in nature but not high enough to cause the film to flow. Further, the temperature of the die cannot be sufficiently high to discolor the layers of material 12 and 14 when placed in contact therewith. Thus, it is seen that the temperature at which the die 20 is heated is dependent upon the type of fabric that is employed in the layers of material 12 and 14 and further is controlled by the characteristics of the plastic film 16.

Figure 3:
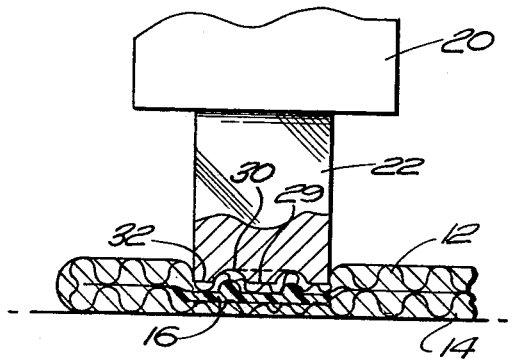
FIG. 3 is a view similar to FIG. 2 and showing the location of the die in contact with the article for the fusing of the materials prior to the formation of the buttonhole slit.
Figure 4:
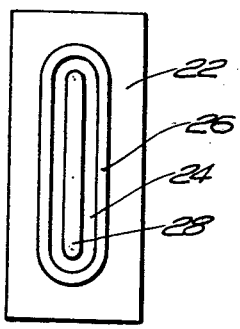
FIG. 4 is a bottom plan view of the die as illustrated in FIG. 2.

With the die heated as indicated, it is then brought into intimate contact with the layers of material as indicated in FIG. 3. Sufficient pressure must be supplied by the die 20 to force the die head 22 downwardly so as to cause the layers of material 12 and 14 to fuse to the plastic film 16. In this connection, it is understood that the amount of pressure applied by the head 22 of the die 20 cannot be sufficient so as to be detrimental to the layers of fabric material.

With the proper heat and pressure applied as previously indicated, the die 20 compresses the layers of material 12 and 14 in the configuration as illustrated in FIGS. 1 and 3, wherein the film 16 is fused between the layers of material in a selected area. Since the head 22 of the die is formed with the oval groove 24 therein that defines the oval land 26 and the central land 28, a central groove 29 will be defined in the upper layer 12 of the laminate as formed, the groove 29 in the upper layer 12 being disposed between a marginal bead 30. It is understood that the marginal bead 30 is formed by the oval groove 24 when the head of the die 20 is brought into intimate contact with the layers of material and plastic film 16 disposed therebetween. As further shown in FIG. 3, the oval land 26 also forms an oval groove 32 that surrounds the bead 30.

After the die 20 has fused the layers 12 and 14 to the film 16 to define a laminate, the die is removed; and after a sufficient period of cooling, any convenient tool may be employed for cutting a slit 34 in the groove 29. The slit 34 is cut longitudinally in the groove 29 and defines the buttonhole for the article of clothing or garment. It is understood that the edges of the slit 34 that define the buttonhole are disposed in fused relation, and thus ripping or unraveling of the material surrounding the slit cannot occur. It is further seen that since the plastic film 16 is not exposed and is fused between the layers 12 and 14, the article does not appear to have a buttonhole formed therein, which further enhances the appearance thereof.

Figure 5:
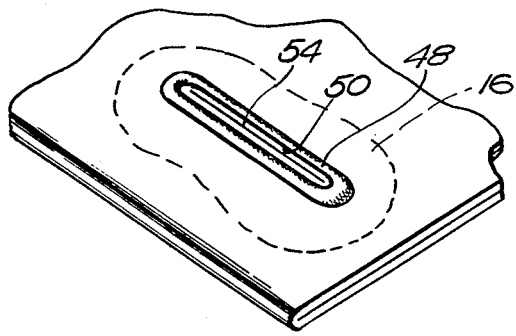
FIG. 5 is a perspective view similar to FIG. 1 showing a modified form of buttonhole construction.
Figure 2:
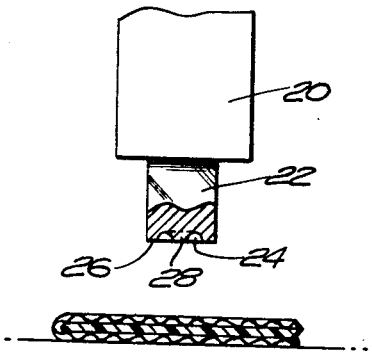
FIG. 2 is a sectional view of a portion of an article in which a buttonhole is to be formed and further shows a die, a portion of which is shown in section, that is adapted to form a buttonhole in the article as illustrated in FIG. 1.
Figure 6:
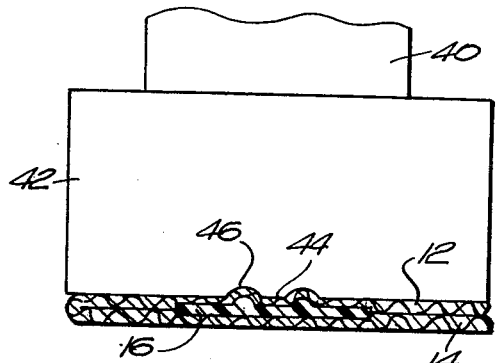
FIG. 6 is a view similar to FIG. 3 illustrating a modified form of die for forming the buttonhole as illustrated in FIG. 5.

Referring now to FIGS. 5 and 6, a modified form of buttonhole construction is illustrated, and in this form of the invention a die 40 is employed that is provided with an enlarged head portion 42. By providing the enlarged head portion 42, the oval land as indicated at 26 hereinabove is eliminated and only a central land 44 as defined by an oval groove 46 is formed in the underside of the enlarged head 42. When the layers of material 12 and 14 are fused to the plastic film 16, the die 40 is brought into contact with the layers of material, the head 42 extending substantially over the area of the upper layer 12. In this manner, only the oval beaded portion as represented at 48 in FIG. 5 is formed together with the interior groove 50 in the selected area of the layers 12 and 14. The fused portion of the layers 12 and 14 cooperates with the film 16 to define a laminate, and after the die 40 is removed from the fused layers, a slit 54 is formed in the laminate and within the oval bead 48.

As described herein in connection with the formation of the buttonhole illustrated in both FIGS. 1 and 5, the slits 34 and 54 are formed in the compressed laminate after the dies have been removed therefrom. It is contemplated that the slit may be formed simultaneously with the fusing of the layers of material to the plastic film, and thus upon removal of the die from engagement with the layers of material, the buttonhole construction will be complete as to the formation thereof.

The buttonhole as formed by the method described herein defines a superior construction from the usual buttonhole known heretofore. It is seen that the buttonhole as formed by the slit in the selected compressed area of the laminate will not rip because of the beaded portion produced by the formation of the die. Not only is the top layer of material formed in the beaded construction, but also the underlying portion of the plastic film. Thus, the beaded portion of the plastic film acts to reinforce the area surrounding the slit that defines the buttonhole and prevents ripping or tearing thereof. Since the plastic film is fused between the layers of material, it is not exposed, and the completed buttonhole has the appearance of being concealed. Further, the concealment of the plastic film prevents direct contact thereof by the user, and only the fabric material comes into contact with the user.

A variety of plastic materials may be employed as the plastic film, and as hereinabove set forth, it is preferred that the plastic film be polymeric in character. Thus, the polymeric plastic may be an elastomer, such as a thermoplastic or a thermosetting elastomer such as a silicone. The selection of the material will, of course, be determined by the fabric used in the layers 12 and 14 and the heat and pressure requirements therefor. As also previously mentioned, it is not required that a second layer of sheet material be employed with the top layer 12, the general definition of "layer" also encompassing a patch of material that can be somewhat reduced in size with respect to the layer 12.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

What is claimed is:

1. In an article of apparel, a first layer of flexible fibrous pervious material, a second layer of flexible fibrous pervious material located in adjacent parallel relation with respect to said first layer of material, a buttonhole construction formed in said layers of material and including a film of plastic material that is interposed between said layers in a selected area of said article of apparel and that is fused to said layers in concealed relation such that there is no exposure of said plastic film exteriorly of said layers of material, a depression formed on at least one side of said layers of material and film in the fused area thereof, the layers of material and film surrounding said depression being deformed to define a marginal bead, said bead being composed of only the deformed material and film created by the depression, the outer surface of said bead being defined by one of said layers of material, said layer of material and said film extending beyond said bead, said depression together with said bead and a portion of said extension being fused together, and a slit extending through the fused plastic film and layers of material in said depression and within the marginal bead, the edges of said slit being fused by said film so as to prevent unraveling or tearing of said material from said slit when it is used as a buttonhole, and the marginal bead defining a reinforcement for the buttonhole slit.

2. In an article of apparel as set forth in claim 1, said plastic film having a thickness of 5–20 mils.

References Cited

UNITED STATES PATENTS

| 35,163 | 5/1862 | Loewenberg | 156—253 X |
|---|---|---|---|
| 2,401,997 | 6/1946 | Whitman | 24—141 X |
| 2,633,618 | 4/1953 | Moe | 24—202 |
| 2,726,396 | 12/1955 | Rosenberg | 24—202 X |
| 2,735,797 | 2/1956 | Schjeldahl | 156—251 X |
| 2,748,047 | 5/1956 | Kuss | 24—142 X |
| 2,821,764 | 2/1958 | Leahy | 24—142 |
| 3,019,152 | 1/1962 | Jones | 24—217 X |
| 3,033,207 | 5/1962 | Rosenberg | 24—202 X |
| 3,263,290 | 8/1966 | Eguchi | 24—202 |

FOREIGN PATENTS 754,571  8/1956  Great Britain.

BERNARD A. GELAK, Primary Examiner

U.S. Cl. X.R.

2—266; 112—264; 156—253